Dec. 24, 1963  YAO T. LI  3,115,040
PRESSURE SENSING DEVICE
Filed May 8, 1959  2 Sheets-Sheet 1

INVENTOR.
YAO T. LI
BY
EZEKIEL WOLF, WOLF & GREENFIELD
ATTORNEYS

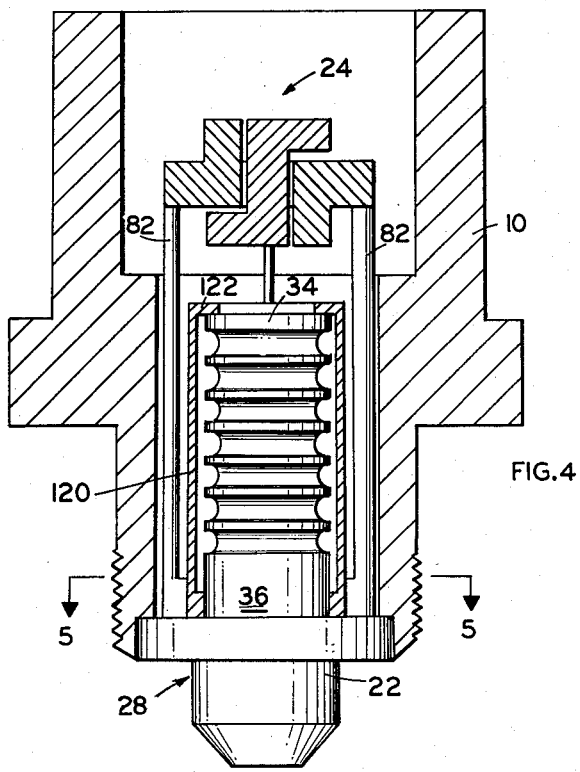
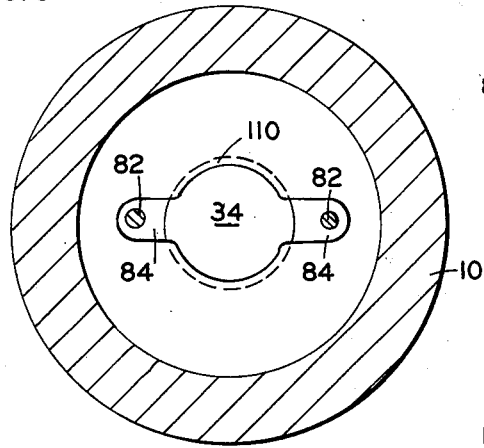
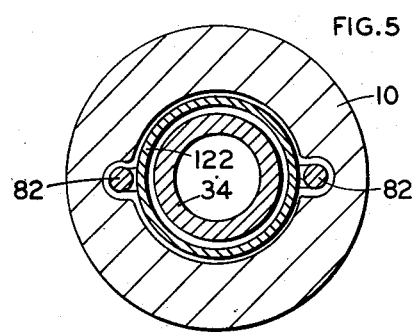

United States Patent Office 3,115,040
Patented Dec. 24, 1963

3,115,040
PRESSURE SENSING DEVICE
Yao T. Li, Huckleberry Hill, South Lincoln, Mass.
Filed May 8, 1959, Ser. No. 811,922
3 Claims. (Cl. 73—410)

This invention relates to pressure gages and more particularly comprises a new and improved pressure gage of miniature size and capable of measuring pressures of a high order.

Diaphragms are commonly used today as pressure sensing elements or pick-ups in gages particularly designed to measure high pressures, that is, pressures in the order of 10,000 pounds per square inch (p.s.i.). For the same maximum stress, the diameter of the diaphragms used as the pressure pick-ups must increase with increases in the intended pressure range to obtain a given diaphragm deflection. Thus, it is extremely difficult to miniaturize a gage which is intended to measure pressures of a high order. In some instances conventional type bellows have been used in place of diaphragms as the pressure sensing element. These diaphragms have proved satisfactory when used to measure moderately high pressures. However, the conventional type of bellows are not satisfactory when axial deflection is desired as the response to internally applied pressure on the bellows. Their unsatisfactory nature becomes more pronounced when the pressure gage is miniaturized for the bellows in turn must be miniaturized as well. When the conventional bellows are miniaturized, the radius of curvature of the diaphragm convolutions must necessarily approach the bellows radius. Moreover, the bellows walls become relatively thick with respect to the overall dimensions of the bellows when the instrument is miniaturized. As a result each convolution of the bellows approaches the shape of a sphere and interior pressure on the walls of the bellows expands the bellows diameter and tends to pull together the ends of the bellows against the pressure applied to the ends.

To overcome the difficulties encountered with the use of diaphragms and conventionally shaped bellows, I have devised a new form of bellows free of the limitations of diaphragms and conventionally designed bellows. My bellows in cross section appear to have scalloped walls made of a series of cylindrical inwardly convex sections, unlike conventional bellows having cross sections which are sinusoidal in shape and dominantly inwardly concaved. The several convolutions are integrally formed with a cap which closes one end of the bellows and with a head which provides a specially formed inlet to the interior of the bellows. The bellows is disposed in a frame open at one end and through which the open bellows head extends. A seat formed about the open end of the frame retains the head in place. A passage formed in the head communicates with the interior of the bellows and is aligned with a passage formed in the fitting which receives the pressure gage. The passage in the fitting in turn communicates with the interior of the vessel or chamber whose internal pressure is to be measured and thus the interior of the bellows is subjected to internal pressures equal to the pressure in the interior of the vessel.

The fitting used with the gage is provided with a cylindrical recess having a tapered seat formed in its bottom which forms a continuation of the passage in the fitting. The head of the gage is provided with a frusto-conical-shaped flange similar to the tapered seat and under conditions which will be described more fully in the detailed specification, forms a seal with the seat to prevent leakage about the pressure gage frame.

A signal generator in the form of an unbonded strain gage is mounted in the frame beyond the bellows. The gage is operated in response to deflection of the bellows in an axial direction. In one embodiment of my invention, a stop is formed as part of the frame and limits axial movement of the bellows in response to internal pressure. This stop serves two important functions, namely, it protects the signal generator against excessive forces which otherwise could be exerted on it under excessive pressures, and protects the bellows by placing the bellows walls in compression. In another embodiment of my invention the stop forms part of a cylinder which surrounds the bellows and permanently engages the axially movable end of the bellows. This cylinder may be used to change the spring constant of the bellows and increase the pressure rating of the gage.

My invention will be better understood and appreciated from the following detailed description of two embodiments thereof, selected for purposes of illustration and shown in the drawing, in which:

FIGURE 3 is a cross sectional view taken along the corresponding section line in FIGURE 1;

FIGURE 4 is an elevation view partly in section of another embodiment of a pressure gage constructed in accordance with my invention;

FIGURE 5 is a cross sectional view taken along the corresponding section line in FIGURE 4.

Figure 1:
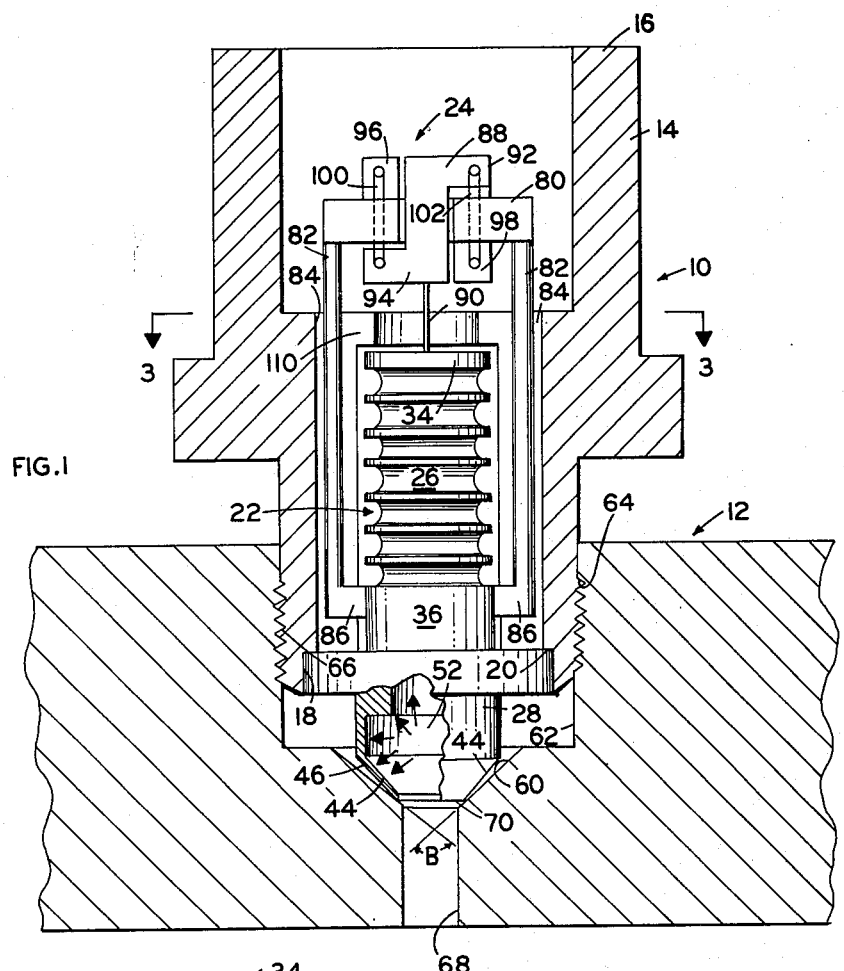
FIGURE 1 is an elevation view partly in section, of a pressure gage constructed in accordance with my invention.

In FIGURE 1, I have illustrated a pressure gage 10 disposed in a fitting 12 which may or may not form an integral part of the wall of the chamber or vessel whose internal pressure is to be measured.

The several components which comprise the pressure gage are assembled in a frame 14 generally cylindrical in shape and forming a hollow housing open at its upper and lower ends 16 and 18 respectively. The lower end 18 of the frame 14 is provided with a seat 20 on which the pressure sensing element 22 is mounted.

The pressure sensing element 22 and the signal generator 24 disposed adjacent the top of the frame 14 comprise the operating elements of the gage. The pressure sensing element 22 is composed of a specially formed bellows 26 and a head 28. These elements are shown in detail in FIGURE 2 and are integrally formed from a single piece of stock.

Figure 2:
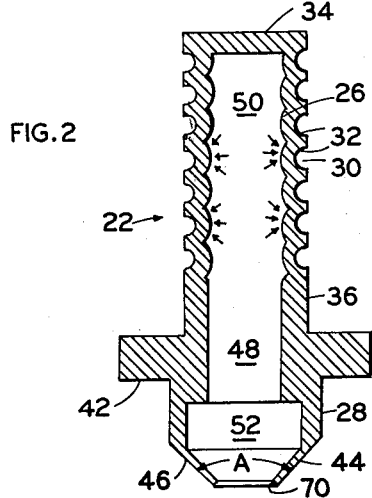
FIGURE 2 is a cross sectional view of the pressure sensing or pick-up element shown in FIGURE 1.

Referring to FIGURE 2, the reader will note that the bellows 26 is made of a plurality of generally cylindrical sections axially aligned and each inwardly convex in cross section. Thus, each convolution 30 is bowed inwardly and is joined to the adjacent convolution at their outwardly extending edges 32. A cap 34 closes the upper end of the bellows 26 while the lower end of the bellows is secured to the upwardly extending cylindrical wall 36 which forms part of the head 28. As suggested in the introduction, this type of bellows configuration will more readily deflect when made in miniature sizes than conventional bellows now available.

Figure 6:
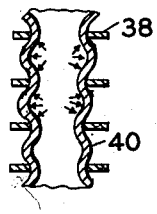
FIGURE 6 is a cross sectional view of a conventional type bellows now in common use.

In FIGURE 6 I have illustrated a conventional bellows and have suggested by the several arrows internal pressure being exerted against the bellows walls. The reader should bear in mind that the entire pressure sensing element shown in FIGURE 2 may be one inch or less in length and have a diameter of approximately one quarter inch. This is the order of magnitude with which applicant is primarily concerned. The bellows in FIGURE 6 includes re-enforcing rings 38 which provide added strength to the bellows in the outwardly concave areas of each convolution. In order for the bellows to be capable of withstanding pressures of 10,000 p.s.i. or more, it is obvious that the thickness of the walls 40 of the bellows must be relatively large with respect to the bellows' diameter as compared to the walls of bellows several times as large. Because of the minute size of the bellows illustrated, the radius of curvature of each of the inwardly concave portions of the convolution 40 must approach the radius of the bellows itself. Therefore, each convolution defined by the portion of the bellows which lies between adjacent re-enforcing rings 38 approaches a circle in vertical cross section and thus, regardless of the pressure applied against the walls of the bellows, little or no axial elongation will occur. Any elongation which does occur is primarily due to the stretching of the walls as opposed to the straightening of the walls. This is analogous to the effect upon a sphere of increasing its internal pressure. A sphere will increase in size in all directions as opposed to one particular direction, in response to an increase in its internal pressure. Referring now to FIGURE 2, the reader will appreciate that regardless of how small or large the radius of curvature of the various sections of the bellows 26, internal pressure will tend to elongate the bellows axially. There is no critical relationship between the radius of curvature of the various convolutions and the radius of the bellows itself.

The head 28 of the pressure sensing device includes an outwardly extending flange 42 and a frusto-conical-shaped flange 44 connected to the bottom of the cylindrical wall 36. The flange 44 is quite thin, and, therefore, the angle A defined by the converging wall sections of the flange may be altered under pressure. The outer surface 46 of the flange, for reasons which will be explained in detail below, should be machined so as to have a smooth outer surface. A passage 48 extends through the head 28 and communicates with the interior 50 of the bellows 26. The lower portion of the passage 48 is somewhat enlarged and forms a chamber 52 defined at its lower side by the frusto-conical-shaped flange 44.

Referring again to FIGURE 1, it will be noted that the pressure sensing device 22 is inserted through the open end 18 of the frame 10 and the outwardly extending flange 42 is disposed on the seat 20 formed about the opening. When assembled in the frame, the head 28 extends downwardly out of it and the flange 44 forms a seal with the seat 60 of the fitting 12. The fitting 12 includes a cylindrical recess 62 having a threaded portion 64 which registers with the threads 66 cut in the frame 10. The seat 60 formed at the base of the recess 62 is frusto-conical in shape and terminates in a passage 68 which communicates with the interior of the chamber or vessel whose internal pressure is to be measured.

It will be noted in FIGURE 1 that the angle B formed between the converging sides of the seat 60 is slightly larger (perhaps one degree) than the angle A defined by the sides of the frusto-conical-shaped flange 44 of the pressure sensing element. Thus, when the frame 10 is screwed into the recess 62 the lower edge 70 of the flange 44 engages the seat 60 and the seat and flange diverge from that point of contact. In use, it is only necessary to tighten the frame 10 in the recess 62 until this line contact is made. Thus, hand tightening is adequate and it is not necessary to employ a wrench to cause the flange 44 to flatten out upon the seat 60.

It is of course necessary to form a seal between the seat 60 and the flange 44 to prevent loss of pressure in the chamber whose internal pressure is to be measured. The particular relationship between the flange 44 and the seat 60 allow such a seal to be made under the influence of pressure itself. In FIGURE 1, a number of arrows are shown in the chamber 52 formed in the head 28 which represent pressure acting in the chamber against its walls. It will be recognized that when the pressure in the chamber to be measured is applied against the flange 44 from the interior of chamber 52, this pressure will urge the flange 44 to flatten out against the seat 60 so that the adjacent surfaces lie in full contact with one another. As the face 46 as well as the seat 60 are machined surfaces, a seal is formed between them when they are pressed together under adequate pressure within the chamber 52. Thus, the device is self-sealing, for just as soon as pressure is introduced into the interior of the pressure sensing element 22, the flange 44 flattens against the seat 60 to provide the necessary seal. Wrenches or other tools which often damage the delicate instruments are not needed to tighten the gage in the fitting. It should also be noted at this time that the seat 60 is somewhat larger than the flange 44 so that the full length of the flange 44 may be utilized to form the seal.

The signal generator 24 is illustrated only diagramatically for the generator per se does not form part of this invention. Described briefly, the generator 24 includes a yoke 80 supported on a pair of rods 82 which extend through opposed slots 84 formed in the sides of the interior wall of the frame 10. The lower ends 86 of the rods are secured to the cylindrical wall 36 of the head 28. Thus, the yoke 80 is fixed with respect to the frame 10 and does not move regardless of the pressure applied to the bellows 26. That is, elongation of the bellows 26 under the influence of pressure will have no effect upon the yoke 80 which is tied to the head 28 fixed in the frame. A core 88 is mounted within the yoke 80 and is free to move relative to it. The core 88 is connected by a force transmitting pin 90 to the cap 34 of the bellows and thus does move in response to axial deflection of the bellows. The core 88 has a pair of oppositely extending arms 92 and 94 which co-operate with a pair of ears 96 and 98 connected to the yoke 80 to support strain wires 100 and 102 wound in tension about pins carried on the arms and ears. Although but two such windings are shown, it is to be understood that several more are included in the signal generator and these windings form the arms of a conventional bridge circuit. It will be appreciated that when the core 88 moves upwardly in the frame 14 in response to elongation of the bellows 26, the winding 100 secured between the arm 94 and the ear 96 will have a portion of its tension relieved and its resistance will decrease, while the winding 102 wound between the arm 92 and the ear 98 will elongate and its resistance will increase. A conventional bridge circuit made of such windings will render a signal directly proportional to the displacement of the core 88 with respect to the yoke 80.

It will be noted in FIGURES 1 and 3 that a flange 110 forming part of the frame 10 extends inwardly over the cap 34 of the bellows 26 and is spaced slightly above it. The flange 110 forms a stop to prevent elongation of the bellows 26 beyond a limited amount defined by the gap between the upper surface of the cap 34 and the lower surface of the flange 110. This stop performs two very important functions. First, it limits the displacement of the core 88 with respect to the yoke 80 of the signal generator by limiting the amount of pressure that may be applied to the core by the bellows. Thus, the signal generator 24 cannot be damaged by excessive pressure being applied to it. The second function performed by the stop is more subtle. When the cap 34 reaches the flange 110 under the influence of internal pressure in the bellows 26, any further increase in the internal pressure of the bellows will place the various portions of the bellows wall in compression. Obviously, the walls of the bellows acting in compression can withstand a maximum pressure in the order of 40,000–50,000 p.s.i. without rupturing.

In operation, my pressure gage is used as follows: Initially, the frame 10 is hand tightened in the recess 62 of the fitting 12. This tightening will cause the lower edge 70 of the flange 44 to engage the seat 60 at the bottom of the recess and the gage will assume the position shown in FIGURE 1. When assembled in this manner, the gage is ready to render the pressure measurements desired. The passage 68 formed in the fitting as a continuation of the seat 60 and which communicates with the vessel whose internal pressure is to be measured will permit the gases in the vessel to flow into the head 28 of the pressure sensing element 22 and exert a like pressure against the bellows walls. As explained above, the pressure of the gas which flows into the chamber 52 formed in the head will cause the flange 44 to flatten against the seat 60 and provide a seal between these parts. Thus, no gas in the interior of the vessel will be permitted to leak out about the frame to the atmosphere.

The internal pressure applied to the walls of the bellows will cause the bellows to elongate and, by means of the force transmitting pin 90, move the core 88 of the signal generator upwardly with respect to the fixed yoke 80. This relative movement between the yoke and the core will cause the resistance of the unbonded strain windings to vary and produce a signal across a conventional bridge circuit which includes these windings.

The embodiment of my invention shown in FIGURES 4 and 5 closely resembles that described above. Thus, in this embodiment of my invention a frame 10 also houses a pressure sensing element 22 and a signal generator 24. The signal generator 24 is supported on a pair of rods 82 which extend downwardly through slots formed in the sides of the frame just as in the embodiment described above. Only the stop takes a different form than that described earlier. It will be noted in FIGURE 4 that a thin walled cylinder 120 is secured at its lower end to the cylindrical wall 36 of the head 28 and extends upwardly and engages the cap 34 at the top of the bellows by means of its inwardly extending flange 122. Unlike the stop 110 in the previously described embodiment, the stop 122 formed by the flange engages the bellows cap 34 even in the absence of internal pressure on the bellows and continuously restrains bellows elongation. With this arrangement, the thin walled cylinder 120 augments the bellows and changes its spring constant. Thus, the pressure rating of the gage shown in FIGURE 4 is higher than that of the previously described embodiment. While the gage shown in FIGURE 1 may have a maximum rating of 30,000 p.s.i., the gage shown in FIGURE 4 may have a rating of upwards of 40,000 p.s.i. This arrangement causes the bellows walls to act continuously in compression so that greater loads may be carried without rupture. In all other respects, this gage is the same as that shown in FIGURE 1, and, therefore, it is deemed unnecessary to describe its operation.

I have suggested above that the pressure sensing element which includes the bellows is made as a unitary structure from a single piece of stock. The element is formed from a tube having a diameter slightly greater than the diameter of the flange 42. The head 22 including the wall 36 is first formed in one end of the tube and the outer surfaces are shaped to the first inwardly convex section of the bellows. Thereafter, a notch, rectangular in cross section, is cut circumferentially about the tube at the location of the first inwardly convex section. After the notch is cut, a roller is employed to round out the notch and form the inwardly convex wall. The roller in the form of a wheel is mounted to rotate at a fixed location and the tube is disposed immediately adjacent to it and with its axis parallel to the axis of rotation of the roller and in close proximity to one another so that the roller actually lies in the notch. Axial rotation of the tube causes the roller to run about the circumferential notch to shape the wall as shown in FIGURE 2. After the first section of the bellows is completed in this manner, a second notch is cut as the first step in forming the adjacent inwardly convex section. Thereafter, the roller is employed to complete the shaping of the second notch. Thus it is seen that each section of the bellows is completed before the formation of the next section is begun. Throughout the fabrication, pressure is applied to the ends of the tube to prevent axial elongation in response to the pressures of the cutting tool which forms the notches and the roller. It should be noted also that the enlarged chamber in the head is formed only after the bellows is completed.

From the foregoing description those skilled in the art will appreciate that numerous modifications may be made of my invention without departing from its spirit. Therefore, I do not intend to limit the breadth of my invention to the two embodiments illustrated and described. Rather, it is my intention that the breadth of my invention be determined by the appended claims and their equivalents.

What I claim as new and desire to secure by Letters Patent of the United States is:

1. In a pressure gage having a housing and a signal generator disposed in the housing, a pressure pick-up comprising a bellows having an uninterrupted series of axially aligned cylindrical sections each being inwardly convex and adapted to sense high internal pressures, a head connected to one end of the bellows and extending out of the housing, means forming a passage through the head and communicating with the interior of the bellows, a cap closing the other end of the bellows, means mechanically connecting the closed end of the bellows to the signal generator, and a stop secured to the housing limiting elongation of the bellows and causing the sections of the bellows to act in compression when continued high pressure is applied to the interior of the bellows while it is in contact with the stop.

2. A pressure gage comprising a cylindrical frame, a pressure pick-up disposed in the frame and having a head extending out one end of the frame, said pick-up including a metallic bellows having an uninterrupted series of inwardly convex sections connected to the head and disposed in the frame, said bellows being adapted to sense high internal pressures, walls forming an opening in the head and communicating with one end of the bellows, a cap closing the other end of the bellows, and a signal generator disposed in the frame and connected to the closed end of the bellows, said generator producing a signal in response to changes in length of the bellows, and means secured to the frame causing said bellows sections to act in compression when said bellows achieves a selected length.

3. In a pressure gage having a housing and a signal generator disposed in the housing, a pressure pick-up comprising a bellows having an uninterrupted series of axially aligned cylindrical sections each being inwardly convex and adapted to sense high internal pressures, a head connected to one end of the bellows and extending out of the housing, means forming a passage through the head and communicating with the interior of the bellows, a cap closing the other end of the bellows means mechanically connecting the closed end of the bellows to the signal generator, and a stop means comprising a cylinder one end of which is secured to said head of the bellows and the other end of which is secured to the cap of the bellows, said cylinder causing said sections to act in compression at all pressures sensed by the gage, said stop means acting to change the spring constant of the bellows and allow the gage to withstand without rupture and to measure higher pressures.

References Cited in the file of this patent

UNITED STATES PATENTS

| | | |
|---|---|---|
| 839,981 | Bristol | Jan. 1, 1907 |
| 966,790 | Bristol | Aug. 9, 1910 |
| 971,838 | Fulton | Oct. 4, 1910 |
| 1,094,323 | Fulton | Apr. 21, 1914 |
| 1,095,100 | Fulton | Apr. 28, 1914 |
| 1,617,857 | Mallory | Feb. 15, 1927 |
| 2,059,549 | Carlson | Nov. 3, 1936 |
| 2,124,735 | Flint | July 26, 1938 |
| 2,412,685 | Hoffman et al. | Dec. 17, 1946 |
| 2,554,931 | Welden | May 29, 1951 |
| 3,022,672 | Dimeff et al. | Feb. 27, 1962 |

FOREIGN PATENTS

| | | |
|---|---|---|
| 829,040 | France | June 8, 1938 |
| 720,100 | Great Britain | Dec. 15, 1954 |